UNITED STATES PATENT OFFICE

HEINRICH HOYER AND EUGEN GLIETENBERG, OF LEVERKUSEN-ON-THE-RHINE, GERMANY, ASSIGNORS TO GENERAL ANILINE WORKS, INC., OF NEW YORK, N. Y., A CORPORATION OF DELAWARE

MONOAZO DYESTUFFS

No Drawing. Application filed January 3, 1931, Serial No. 506,491, and in Germany January 14, 1930.

The present invention relates to monoazo dyestuffs, more particularly it relates to dyestuffs which may be represented by the general formula:—

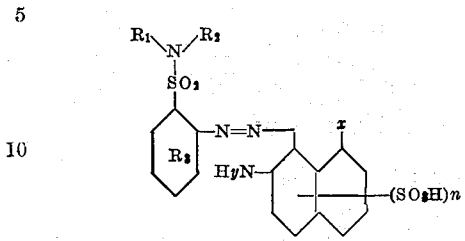

wherein $R_1$ stands for an alkyl group containing at least one hydroxyl group, $R_2$ stands for a benzene nucleus which may be substituted by halogen, alkyl or oxalkyl, $x$ stands for hydrogen or a hydroxyl group, $y$ stands for hydrogen, alkyl or phenyl, $n$ stands for one of the numbers 1 and 2 and wherein the benzene nucleus $R_3$ may be substituted by halogen, alkyl, oxalkyl, the nitro group, the amino group or an acylamino group.

Our new dyestuffs are generally bluish-red to bluish-black powders soluble in water and dyeing wool from an acid bath bluish-red to blue shades of good fastness properties.

The invention is illustrated by the following examples, without being restricted thereto:—

Example 1

337 parts by weight of 4-nitro-1-aminobenzene-2-sulf-oxy ethylanilide, which can be produced, for example, by condensing 4-nitro-1-chlorobenzene-2-sulfochloride with hydroxyethyl-aniline and exchanging the chlorine atom of the resulting condensation product for the amino group by means of ammonia (melting point 127–128° C.), are diazotized. The diazo solution is caused to flow slowly into a solution of 239 parts by weight of 2-amino-8-hydroxynaphthalene-6-sulfonic acid, maintained weakly acid to Congo. A blue wool dyestuffs having in its free state the formula:—

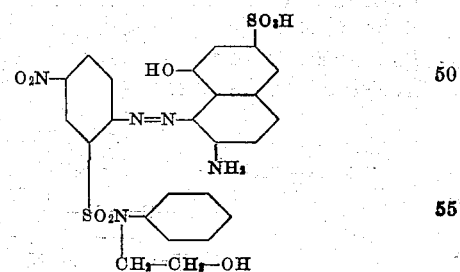

is obtained, which besides other satisfactory fastness properties exhibits a very good solubility.

Example 2

The diazo solution from 337 parts by weight of the amine described in Example 1 is caused to flow slowly into a solution of 253 parts by weight of 2-methylamino-8-hydroxy-naphthalene-6-sulfonic acid, maintained weakly acid to Congo, whereby coupling takes place with the formation of a blue wool dyestuff, which yields a somewhat greener shade than that of the dyestuff of Example 1 but exhibits the same good solubility and similar good fastness properties. The dyestuff has in its free state the formula:—

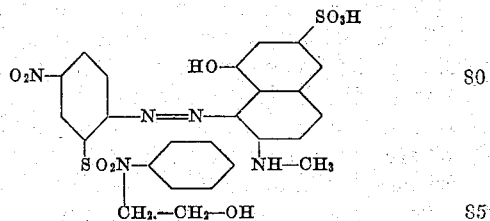

Example 3

By producing the dyestuff produced according to Example 1 by means of sodium sulfide in alkaline solution a wool dyestuff having in its free state the formula:—

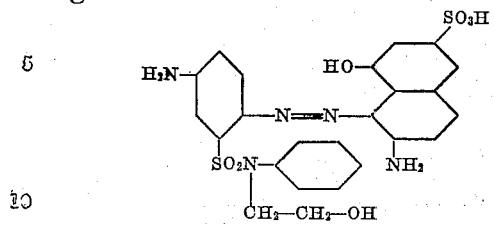

and dyeing a Bordeaux red is obtained, in which the benzene nucleus contains the amino group in the 4-position and which exhibits besides other satisfactory fastness properties a very good solubility.

*Example 4*

By acetylating the free amino group of the dyestuff produced in accordance with Example 3 in the customary manner a displacement of the shade towards red takes place. The dyestuff thus produced, having in its free state the formula:—

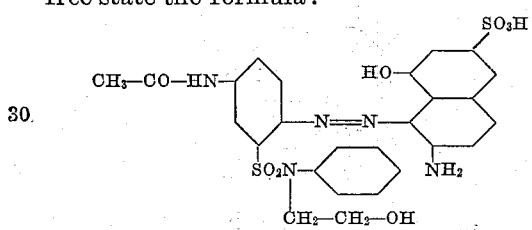

possesses in addition to other satisfactory fastness properties a very good solubility.

We claim:—

1. As new products azo dyestuffs of the general formula:—

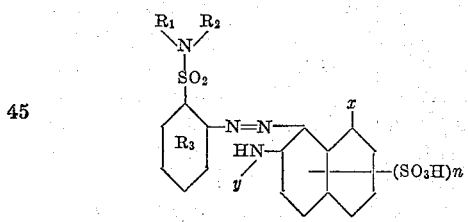

wherein $R_1$ stands for an alkyl group containing at least one hydroxyl group, $R_2$ stands for a benzene nucleus which may be substituted by halogen, alkyl or oxalkyl, $x$ stands for hydrogen or a hydroxyl group, $y$ stands for hydrogen, alkyl or phenyl, $n$ stands for one of the numbers 1 and 2 and wherein the benzene nucleus $R_3$ may be substituted by halogen, alkyl, oxalkyl, the nitro group, the amino group or an acylamino group, said products being generally bluish-red to bluish-black powders soluble in water and dyeing wool from an acid bath bluish-red to blue shades of good fastness properties.

2. As new products azo dyestuffs of the general formula:—

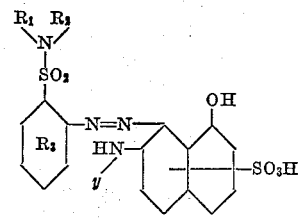

wherein $R_1$ stands for an alkyl group containing at least one hydroxyl group, $R_2$ stands for a benzene nucleus which may be substituted by halogen, alkyl or oxalkyl, said products being generally bluish-red to bluish-black powders soluble in water and dyeing wool from an acid bath bluish-red to blue shades of good fastness properties.

3. As a new product an azo dyestuff of the formula:—

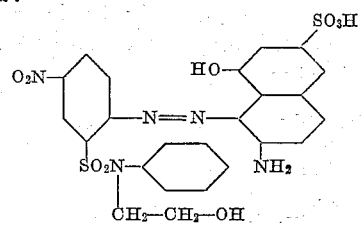

dyeing wool blue shades of good fastness properties.

4. As a new product an azo dyestuff of the formula:

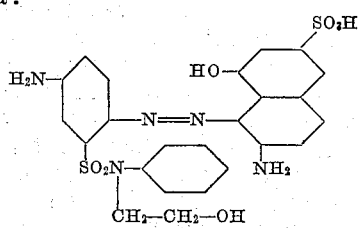

dyeing wool Bordeaux red shades of good fastness properties.

5. As a new product an azo dyestuff of the formula:

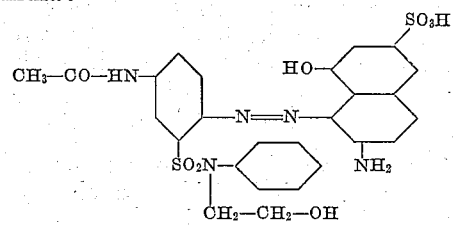

dyeing wool red shades of good fastness properties.

In testimony whereof, we affix our signatures.

HEINRICH HOYER.
EUGEN GLIETENBERG.